United States Patent
Kossow

[11] 3,888,324
[45] June 10, 1975

[54] ELECTRIC VEHICLE

[76] Inventor: Robert G. Kossow, 4941 62nd St., Sacramento, Calif. 95820

[22] Filed: Jan. 30, 1970

[21] Appl. No.: 7,072

[52] U.S. Cl............... 180/21; 180/26 R; 180/27; 180/52; 280/DIG. 5
[51] Int. Cl................ B62d 61/00; B60k 17/30
[58] Field of Search............. 180/26, 52, 21; 280/DIG. 5

[56] References Cited
UNITED STATES PATENTS

| 700,209 | 5/1902 | Lawson | 180/26 |
|---|---|---|---|
| 2,844,209 | 7/1958 | Brunderman | 280/DIG. 5 |
| 3,219,137 | 11/1965 | Appleton | 180/26 |
| 3,224,524 | 12/1965 | Laher | 180/26 |
| 3,229,782 | 1/1966 | Hilton | 180/26 R |
| 3,506,080 | 4/1970 | Hott et al. | 180/26 |

FOREIGN PATENTS OR APPLICATIONS

| 21,686 | 10/1898 | United Kingdom | 180/26 |

OTHER PUBLICATIONS

Time Out Cartoon, Washington Daily News, Monday, July 16, 1962, p. 25.

Primary Examiner—David Schonberg
Assistant Examiner—John P. Silverstrim
Attorney, Agent, or Firm—Blair & Brown

[57] ABSTRACT

An electric vehicle is disclosed in which the front wheels are mounted on a solid axle which turns about a vertical central king pin with the front wheels having an electric motor connected thereto by an endless drive member to rotate the front wheels. A light weight frame supports the passengers seat positioned between a pair of trailing large diameter support wheels with the electric batteries positioned beneath the seat. A tiller bar controls the direction of the front wheels and carries operating switches to control the operation of the motor as well as a hand operated brake which prevents rotation of the front wheels when applied. A foot operated brake applies braking pressure to the rear wheels as desired.

1 Claim, 12 Drawing Figures

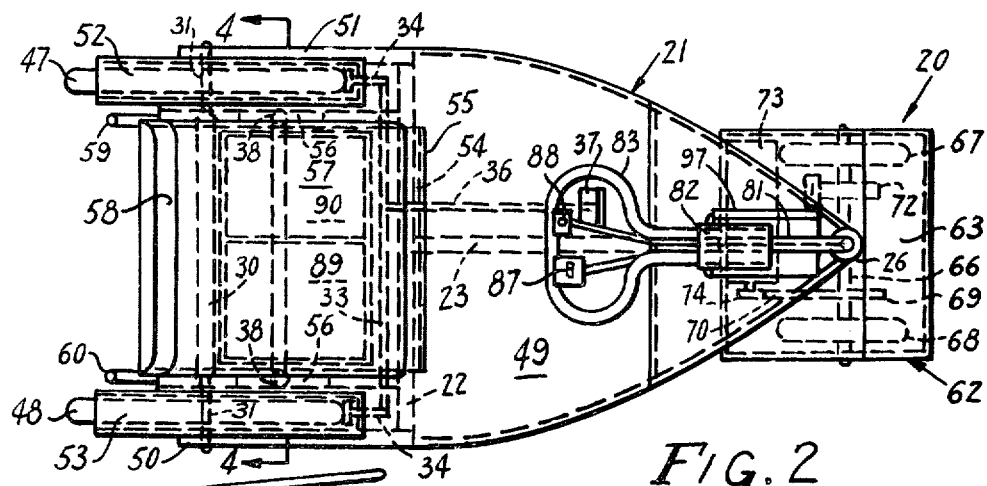
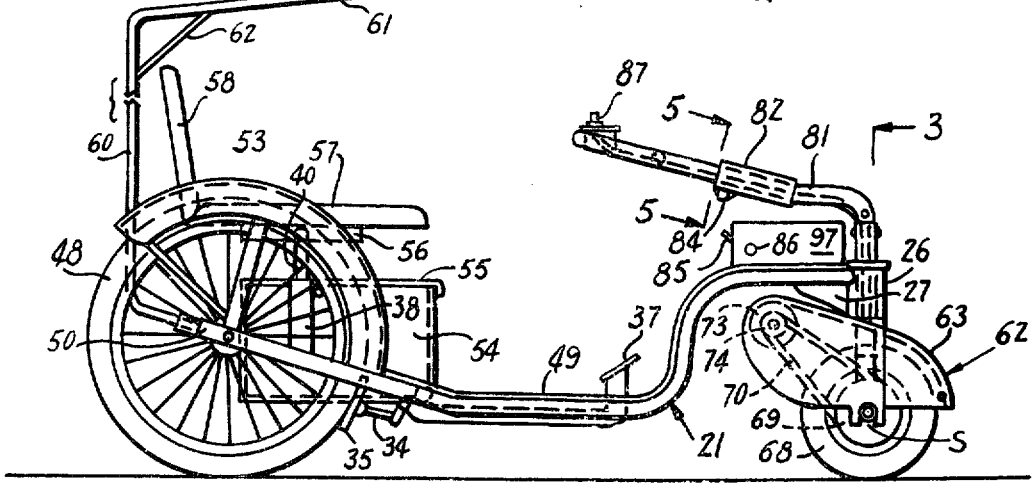
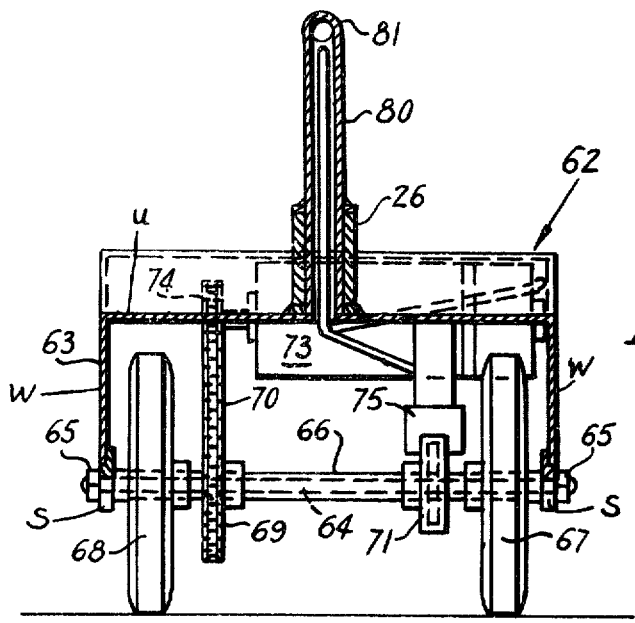

INVENTOR.
ROBERT G. KOSSOW
BY
Alexander B. Blair
ATTORNEYS.

INVENTOR.
ROBERT G. KOSSOW
BY
Alexander B. Blair
ATTORNEY.

ELECTRIC VEHICLE

BACKGROUND OF THE INVENTION

FIELD OF THE INVENTION

The present invention relates to electric vehicles and more particularly to light weight single passenger electric vehicles.

SUMMARY OF THE INVENTION

The present invention is directed to a single passenger electric vehicle having a front wheel drive with the front wheels being mounted on a solid axle having a vertical king pin mount therefor. The front wheels are driven by an electric motor with electricity furnished by electric batteries mounted on a light weight frame beneath an adjustable seat for the passenger. Relatively large diameter wheels support the rear of the light weight frame and hand and foot operated brakes are provided respectively for the front and rear wheels under the control of the driver. A steering tiller controls the direction of the front wheels and has controls for the operation of the vehicle incorporated therein.

BRIEF DESCRIPTION OF THE DRAWING

FIG. 1 is a side elevation of the invention;

FIG. 2 is a top plan view of the invention;

FIG. 3 is an enlarged fragmentary transverse cross section taken along the line 3—3 of FIG. 1 looking in the direction of the arrows;

DESCRIPTION OF THE PREFERRED EMBODIMENT

Figure 4:
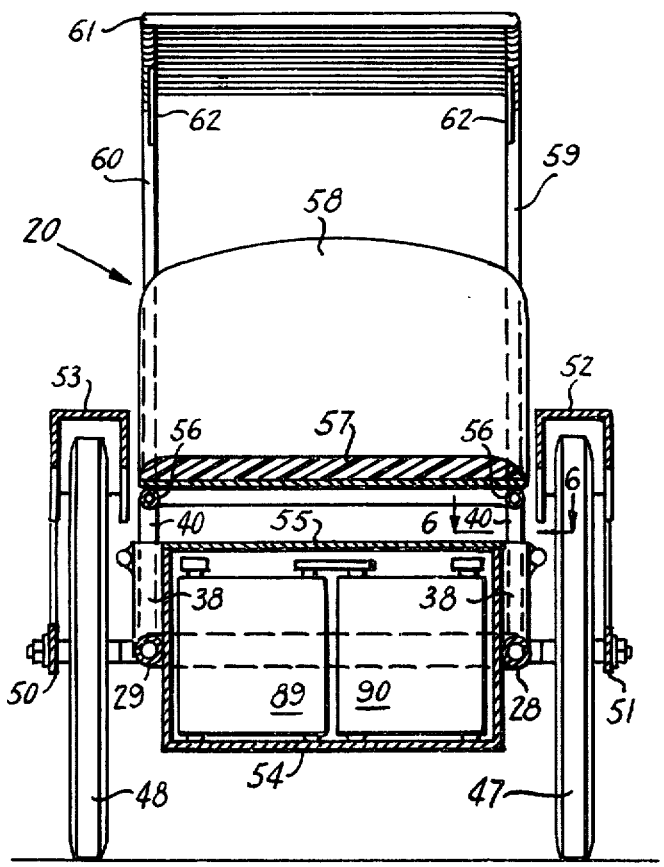
FIG. 4 is an enlarged fragmentary vertical section taken along the line 4—4 of FIG. 2 looking in the direction of the arrows.
Figure 5:
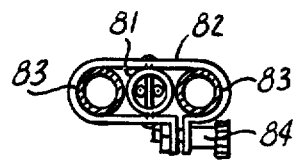
FIG. 5 is an enlarged fragmentary transverse section taken along the line 5—5 of FIG. 1 looking in the direction of the arrows.
Figure 6:
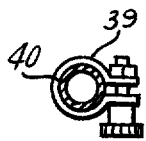
FIG. 6 is an enlarged fragmentary horizontal section taken along the line 6—6 of FIG. 4 looking in the direction of the arrows.

Referring now to the drawings in detail wherein like reference characters indicate like parts throughout the several figures the reference numeral 20 indicates generally an electric vehicle constructed in accordance with the invention.

The electric vehicle 20 includes a frame generally indicated at 21 and having a transverse member 22 extending horizontally thereacross and having a forwardly extending frame member 23 integrally secured thereto and projecting perpendicularly therefrom in a horizontal plane. The frame member 23 has an upwardly extending goose necked portion 24 and a forward horizontal extension 25 integrally formed thereon. A vertical tubular bushing 26 is integrally secured to the frame member 23 and is provided with a web brace 27 on the underside thereof to secure the bushing 26 rigidly thereto.

Figure 7:
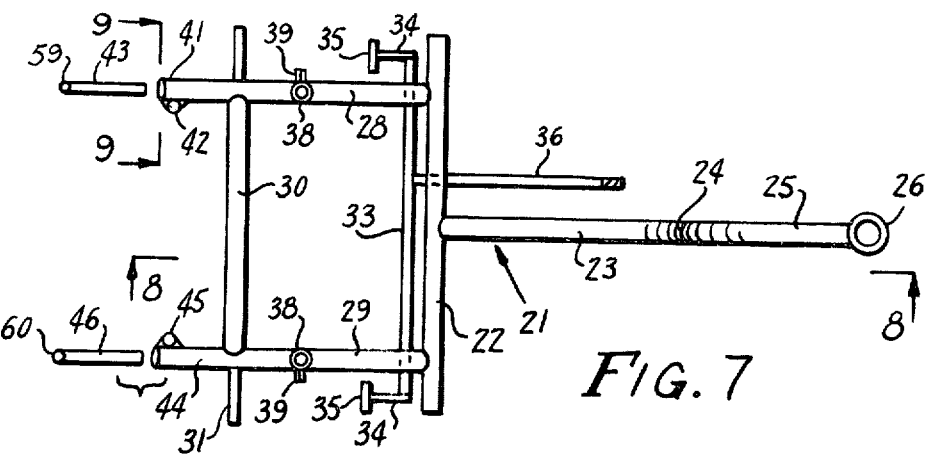
FIG. 7 is a plan view of the frame.
Figure 8:
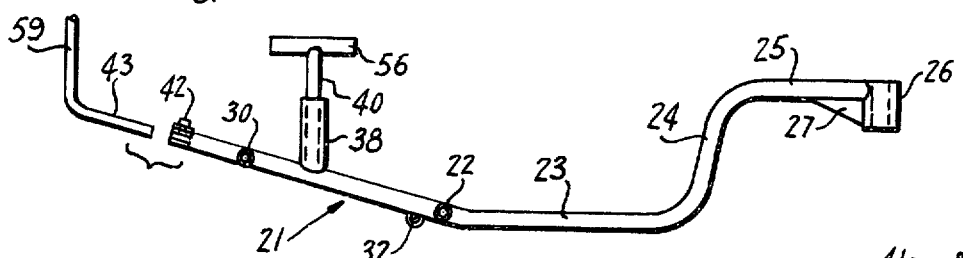
FIG. 8 is a fragmentary longitudinal section taken along the line 8—8 of FIG. 7 looking in the direction of the arrows.
Figure 9:
FIG. 9 is an enlarged fragmentary transverse section taken along the line 9—9 of FIG. 7 looking in the direction of the arrows.
Figure 10:
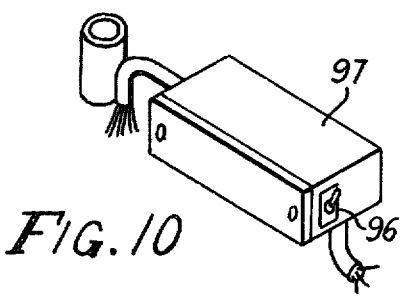
FIG. 10 is a perspective view of the control box.
Figure 11:
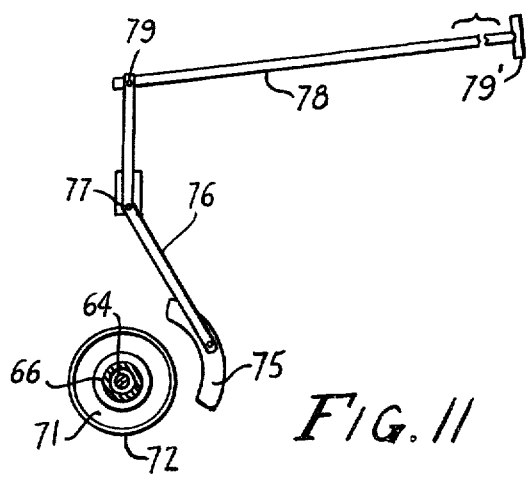
FIG. 11 is a side elevation of the front wheel brake structure shown in fragmentary detail.

An upwardly and rearwardly sloping tubular frame member 28 is integrally secured at its forward end to the transverse member 22 adjacent one end thereof and a second upwardly and rearwardly sloping tubular frame member 29 extends parallel to the frame member 28 and is secured at its forward end to the opposite end of the transverse frame member 22. A shorter frame member 30 extends parallel to the transverse frame member 22 and integrally connects the rear end portions of the frame members 28, 29 as can be clearly seen in FIG. 7. An axle 31 is mounted in the transverse frame member 30 and extends outwardly at each end beyond the frame members 28, 29. A pair of bushings 32 are secured to the frame members 28, 29 respectively adjacent the transverse frame member 22 and have a transverse brake rod 33 journalled therein. Brake arms 34 are secured to opposite ends of the brake rod 33 and have brake shoes 35 mounted thereon. A brake operating rod 36 is integrally connected to the brake rod 33 and has a foot pedal 37 mounted on its free end.

An upstanding socket 38 is mounted on each of the frame members 28, 29 intermediate the transverse frame members 22, 30 and are arranged in parallel relation. The upper portion of each of the sockets 38 is formed into a clamp 39 to clamp a seat support bar 40 therein. The seat support bar 40 may be vertically adjusted as desired.

The terminal end 41 of the frame member 28 forms a socket having a clamp 42 forming part thereof to clamp a rod 43 into the frame member 28 for longitudinal adjustment. The terminal end 44 of the frame member 29 has a clamp 45 associated therewith to clamp a rod 46 within the frame member 29 for longitudinal adjustment therein.

A pair of wheels 47, 48 are journalled on the opposite ends of the axle 31 in a position to be engaged by the brake shoes 35. A relatively flat body 49 is supported on the frame 21 and has rear extensions 50, 51 which engage over the outer ends of the axle 31. A pair of fenders 52, 53 overlie the wheels 47, 48 respectively and are secured to the frame 21 and the body 49. A battery box 54 is secured to the frame 21 between the frame members 28, 29 and forwardly of the transverse frame member 30. The battery box 54 has a removable cover 55 secured thereto.

The seat support posts 40 each have a T-head 56 secured to the upper end thereof on which a seat 57 having a back 58 is mounted. The seat 57 can be vertically adjusted by adjusting the post 40 in the sockets 38.

Extending upwardly from the rods 43, 46 are a pair of bars 59, 60 having a top 61 secured to the upper ends thereof and extending over the seat 57 to shade the rider. Angular braces 62 extend between the top 61 and the respective rods 59, 60 to stabilize the top 61.

A steering and driving wheel assembly 62 is arranged to support the forward end of the electric vehicle 20. The steering and driving wheel assembly 62 includes a rigid housing 63 having a pair of spaced parallel opposite side walls W connected by an upper wall U and having a shaft 64 extending horizontally thereacross with threaded ends extending through U-shaped slots S in the side walls W and rigidly and releasably secured at its opposite ends thereto by means of a pair of threaded nuts 65. A tubular shaft 66 is journalled on the shaft 64 and has a pair of wheels 67, 68 rigidly secured thereto adjacent respectively the opposite side walls W. A sprocket 69 is also rigidly secured to the tubular shaft 66 and has a drive chain 70 engaged therewith. A hub 71 is rigidly secured to the tubular shaft 66 intermediate the wheels 67, 68 and has a brake band material 72 secured to the outer surface thereof.

An electric motor 73 is secured in the housing 63 and has a sprocket 74 mounted on one end thereof and engaged with the drive chain 70. A brake shoe 75 is carried by an arm 76 pivoted at 77 in the housing 63 so that swinging movement of the arm 76 will engage the brake shoe 75 with the brake band 72. A hand actuated arm 78 is pivotedly connected at 79 to the upper end of the arm 76 and has a hand grip 79 formed on its rear end.

An upstanding elongate tubular neck 80 is mounted on the housing 63 and is journalled in the bushing 26 to support the forward end of the frame 21 and to permit the driving and steering wheel unit 62 to be pivoted about a vertical pivot. A goose neck tiller support 81 is secured to the neck 80 and extends rearwardly at an angle thereto. A tiller coupler 82 is secured to the rear end of the goose neck 81 and has a looped tiller bar 83 mounted therein and secured therein by a clamp 84.

Control switches 85, 86 are mounted on the control box 97 and additional control switches 87, 88 are mounted on the looped tiller bar 83. The control switches 85, 86 and the control switches 87, 88 are arranged for either foot or hand operation of the vehicle.

Figure 12:
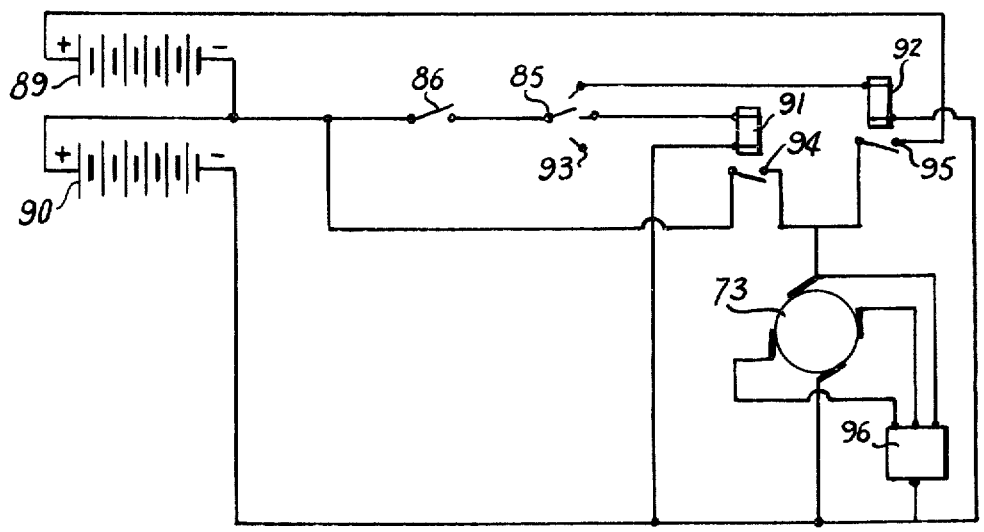
FIG. 12 is a wiring diagram of the circuit of the vehicle.

A pair of 12 volt batteries 89, 90 are mounted in the battery box 54 and as can be seen in FIG. 12 are arranged to power the motor 73.

Referring now in particular to the wiring diagram of FIG. 12 it will be seen that the battery 90 is wired to an off on switch 86 and then to a selector switch 85. The selector switch 85 is connected to a solenoid switch 91 and a second solenoid switch 92. It may be also connected to neutral or off, at 93. When the selector switch 85 is connected to the solenoid 91 a switch 94 is closed, feeding twelve volts from the battery 90 to the motor 73. With the selector switch in a position to energize the relay switch 92 the switch 95 is closed connecting both the battery 89 and the battery 90 in series to the motor 73. Obviously the motor 73 will turn at a much higher rate of speed with the twenty-four volt connection than it will with the twelve volt connection. A reversing switch 96 is provided for reversing the direction of the motor 73 and hence the direction of travel of the vehicle 20.

A box 97 is provided on the frame 21 and has the relay switches 91, 92 contained therein with the reversing switch 96 being mounted on the rear thereof.

In the use and operation of the invention the batteries 89, 90 will be removable for charging if desired or a plug-in battery charger will be adapted to the vehicle to permit the batteries to be charged as needed.

Having thus described the preferred embodiment of the invention it should be understood that numerous structural modifications and adaptations may be resorted to without departing from the spirit of the invention.

What is claimed is:

1. An electric vehicle comprising a generally horizontal frame, a pair of wheels journalled in the rear end of said frame in spaced apart parallel relation, a seat secured to said frame, a battery box secured to said frame and underlying said seat, a vertical bushing secured to the forward end of said frame, a driving and steering unit positioned under and supporting the forward end of said frame, a neck secured to said driving and steering unit and journallled in said bushing for rotation about a vertical axis, a tiller bar secured to said neck and extending rearwardly therefrom for rotating said neck and said driving and steering unit to steer said vehicle, said driving and steering unit including a housing rigidly secured to said neck and turning therewith, said housing including a pair of spaced parallel opposite side walls and an upper wall connecting said side walls, a pair of spaced apart front wheels in said housing and projecting therebelow, said front wheels being respectively adjacent said side walls of said housing, a shaft mounted transversely in said housing, said shaft having threaded opposite ends and said side walls of said housing having generally U-shaped slots formed therein with the threaded ends of said shaft projecting through said slots, a nut threaded on each end of said shaft releasably securing said shaft to said housing, a tubular shaft journalled on said shaft with said front wheels secured to said tubular shaft to revolve therewith, an electric motor secured in and enclosed by said housing a chain sprocket on said motor, a chain sprocket on said tubular shaft, a chain trained over said chain sprockets to rotate said tubular shaft and said front wheels, brake means in said housing for restraining rotation of said front wheels, control means for said electric motor on said tiller bar, and control means for said brake means mounted on said tiller bar for controlling said electric vehicle.

* * * * *